United States Patent [19]

Cucchi

[11] Patent Number: 5,146,462
[45] Date of Patent: Sep. 8, 1992

[54] SYSTEM AND DEVICES FOR TRANSMITTING SIGNALS CONSISTING OF DATA BLOCKS

[75] Inventor: Silvio Cucchi, Gaggiano, Italy
[73] Assignee: Telettra-Telefonia Elettronica, Italy
[21] Appl. No.: 440,889
[22] Filed: Nov. 22, 1989
[30] Foreign Application Priority Data Nov. 23, 1988 [IT] Italy .................... 22702 A/88

[51] Int. Cl.[5] ................. G06F 11/00; H04L 12/00
[52] U.S. Cl. .................................. 371/47.1
[58] Field of Search ........... 371/47.1; 375/114, 115, 375/116

[56] References Cited

U.S. PATENT DOCUMENTS

| | | | |
|---|---|---|---|
| 3,873,920 | 3/1975 | Apple, Jr. et al. | 371/47.1 |
| 3,914,740 | 10/1975 | Han | 371/47.1 |
| 4,208,650 | 6/1980 | Horn | 371/47.1 |
| 4,791,643 | 12/1988 | Molstad et al. | 371/47.1 |
| 4,791,653 | 12/1988 | McFarland et al. | 375/115 |
| 4,821,270 | 4/1989 | Mauge | 371/47.1 |

*Primary Examiner*—Jerry Smith
*Assistant Examiner*—Phung M. Chung
*Attorney, Agent, or Firm*—Ostrolenk, Faber, Gerb & Soffen

[57] ABSTRACT

The transmission of digital signals consisting of data blocks, each delimited by one of several possible words (DDi) and enumerated in transmission by enumeration which is reconstructable upon reception even in presence of errors. The transmission is a pseudo-random sequence that assumes e,g, values of 0 or 1, which values are correlated with two data block delimiting words named respectively DD0 and DD1. The reception side forms two pseudo-random sequences, one of which is supplied by a local generator and identical to the transmission sequence, the other sequence being reconstructed according to the revealed data delimiting words. The comparison between the two pseudo-random sequences obtained in this manner in reception provides, after initial synchronization, verification of the correct interpretation of the received data blocks delimiting words and, in case of interpretation errors, applies suitable resynchronization actions for recovering the correct enumeration of received data blocks.

1 Claim, 2 Drawing Sheets

SYSTEM AND DEVICES FOR TRANSMITTING SIGNALS CONSISTING OF DATA BLOCKS

BACKGROUND OF THE INVENTION

1. Field of the Invention

The present invention relates to a system for transmitting digital signals including data blocks, each of the blocks being delimited by one of many possible words (DDi) that are introduced in the transmission side and are reconstructed in reception, the blocks being located in transmission according to an enumeration that must be reconstructible in reception according to the received composite signal, even in the case in which transmission line errors can cause the data block delimiting words to switch with one another or destroy some of these words and/or introduce untransmitted delimiting words.

2. Description of the Related Art

Many applications of numerical transmission require the transmission of data blocks, these blocks being disposed according to an ordered succession (e.g. according to the integer ciphers 0, 1, 2, 3 ...) and this ordering must be stored and recognized in the reception side, even in presence of errors in the data transmission.

Many applications require data blocks that have a randomly variable dimension (bit number) and the single data of each block are coded with a variable length e.g., by Huffman's codes; the delimiting of data blocks uses some well-known technique, such as the use of synchronization words or the use of data block delimiting words (in the following, these delimiting words are indicated as DDi, with i being the integer cipher 0, 1, 2, ... i ... n−1, n).

The synchronization words have the drawback of having a high bit number to avoid being interpreted as words or word sequences of data blocks in presence of transmission errors. Therefore, a synchronization word is used for a certain number of data blocks and further, if necessary, the length information (expressed in bit number) of the blocks that follow the synchronization word is sent into the transmission line.

When DDi words are used, these words are located at the end of each data block, and when more than one DDi word is used, various DDi words are used so that it is possible to recognize, in addition to the limit of data blocks, the grouping limits of data blocks. To better explain the problem, reference is made to video signal coding by the use of discrete cosine transforms (DCT).

Considering the sole luminance signal and considering the video signal in digital form, the points in each part of a video frame are grouped in square blocks of 8×8 points; the DCT transform is applied to each square block of points and the resulting values are coded in a variable length after a precision reduction. To separate the data related to each initial block of 8×8 image points, DD words can be used in addition to some information that identifies the first 8×8 block in each part of the frame.

On the reception side, the 8×8 blocks of reconstructed image data must be placed in their proper position in the video signal frame. Errors in the transmission of the video signal (or residual uncorrected errors, when the transmitted data are transmitted with error correction codes) can have the effect of destroying some DD words or transforming some data related to the points of 8×8 block into DD words, thus making it impossible to reconstruct the data blocks near the lost or erroneously created DD words, and impossible to properly position the image of 8×8 blocks following the erroneously separated blocks.

The above mentioned drawback can be overcome by transmitting synchronization words at the start of the television frame and using more than one DD word, so that a DD0 word is used at the end of each data block, while a DD1 word replaces the DD0 word every four data blocks, and so on. Greater details on the use of DD words can be found, e.g. in the article of S. Cucchi and F. Molo entitled "DCT Based Video Codes for DS3 Digital Transmission" presented at the *SMPTE Technical Conference*, Oct. 14–19, 1988.

This system is advantageous in many but can be further improved. The object of the present invention is to obtain a more accurate reconstruction of the correct ordering of data blocks, when its separation requires the DD words, this reconstruction being made in presence of transmission errors.

SUMMARY OF THE INVENTION

The invention utilizes the use of two DD words (indicated hereinafter by "DD0" and "DD1") that can be made to correspond to the bit 0 and bit 1, respectively; further, on the data transmission side, the invention utilizes a generator of pseudo-random sequences of appropriate length, this sequence being formed by a succession of bits 0 and 1. The pseudo-random sequence is re-initialized at predetermined instances and the relevant flow emitted (1 or 0) is made to advance by one bit at each data block end; if the above mentioned bit is 0, a DD0 word is inserted at the end of the data block; alternatively, a DD1 word is inserted at the end of the data block if the emitted bit is 1. On the reception side, in absence of errors, the DDi words (i = 0,1) are recognized and, utilizing the correspondence DD0 → 0 and DD1 → 1, a suitable number of bits are accumulated in a shift register, the data being advanced as each new DDi word is received.

The reception side also includes a generator that generates the same pseudo-random sequence used in the transmission side and synchronized (e.g. in the initial transmission phase) with the frequency used in the transmission side. After the initial synchronization phase, the generator of the reception side is advanced by one position (bit) for each received DDi word and the bits at output are sent to a second shift register having a dimension approximately equal to the one that holds the bits 0 and 1 corresponding to the received DD0 and DD1 words. Now, at each advance of one bit of data included in the two shift registers, it can be verified whether the received DDi words are correct or whether some errors have occurred, and this is made using the characteristics of the pseudo-random sequences. These characteristics are described, e.g., in the article "Pseudo-random Sequences and Arrays" by F. J. McWilliams, N. J. A. Sloane, published in *The Proceedings of the IEEE*, December 1976, pages 1715–1729, where the pseudo-random sequences of the more simple type are described, and they are generated by a shift register supplied with feedback connections. Considering these sequences, if n is the number of memory cells of the register, the pseudo-random sequence generated has a length $2^n - 1$. The particular characteristics of these sequences, as regards the present invention, are the characteristic of the window and the characteristic of the correlations among the sequences generated that are in phase with one another or out of phase by one or more bits. The error types that can occur in the two DD0 and DD1 words are of three types, that is: one or more errors on the bits of the DDi words can turn a DD0 word into another, namely, e.g. the DD0 word instead of the DDi word; a second possible error is that a DDi word is changed into a different word which is unrecognizable in reception as a DDi word, and at last, as a third possibility, errors on the words that represent the data in data blocks can change these words or parts of these words into DDi words.

The advantages of the present invention with respect to known methods to assure synchronization between the transmission and reception of data blocks are in particular:

1) By storing in reception at least n bits (corresponding to the DD0 and DD1 words) for a pseudo-random sequence having a length $2^n-1$, it can be recognized at which point of the sequence we are (characteristic of the window of pseudo-random sequences).

2) If the DD0 and DD1 words are reversed, the error can be corrected.

3) If DDi words are created or destroyed in a limited number, typically up to two created or destroyed words, which are relatively near one another, the error can be recognized and the synchronization between the data blocks in transmission and reception can be recovered, although the information related to the data blocks for the last words is not recoverable.

4) No further synchronization of data is necessary if, for significant groups of data blocks, the two generators of pseudo-random sequence in transmission and reception are repositioned on the initial start position. For example, in the case of transmission of television signals, synchronization can be made at the start of each television frame.

BRIEF DESCRIPTION OF THE DRAWINGS

These are other features and advantages of the present invention will become apparent when the following text is read conjunction with the accompanying drawing, in which.

DETAILED DESCRIPTION OF THE PREFERRED EMBODIMENTS

Figures 1, 3A, 3B, 3C:
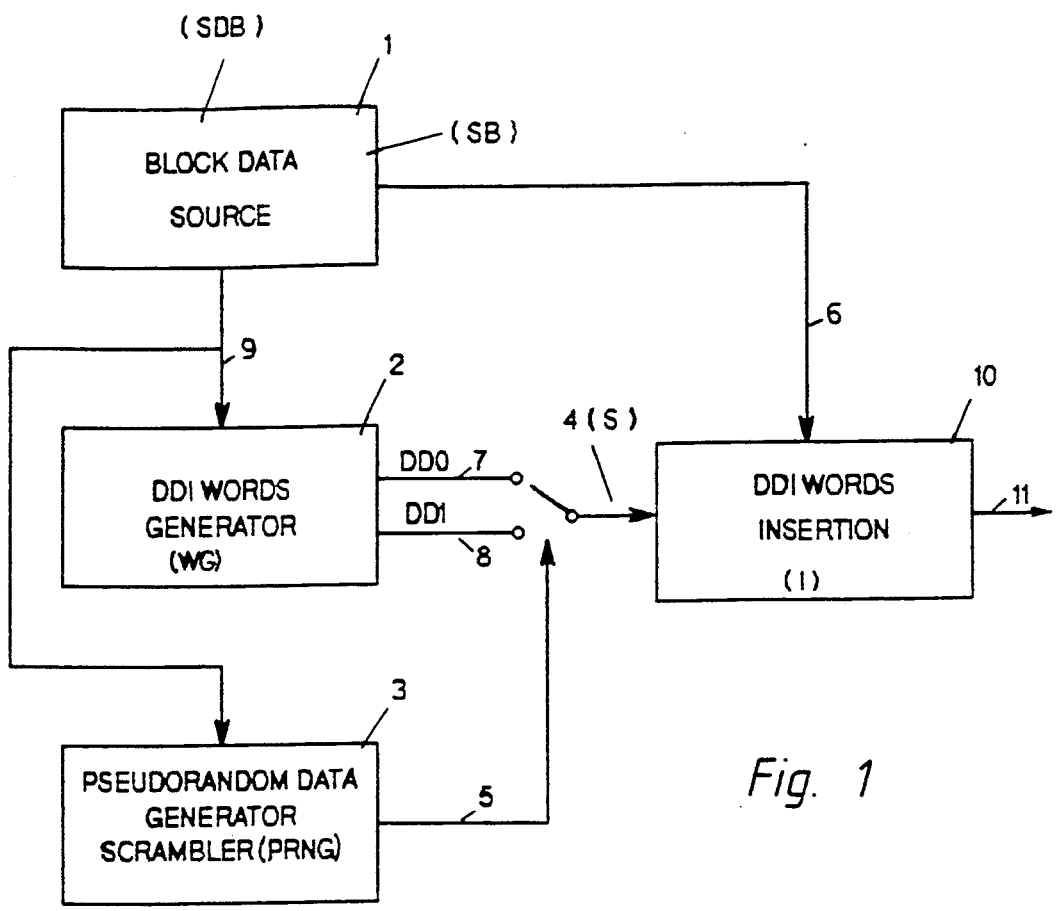
FIG. 1 indicates the structure for the insertion of the data block delimiting words by the use of a pseudo-random sequence on the transmission side.
FIGS. 3a, 3b and 3c indicate the structure of the pseudo-random sequences on the reception side, the frequency generated locally and the frequency recognized by the data delimiting words, as they are recognized in reception and in the case of transmission errors.

With reference to FIG. 1, the source 1 (SDB) emits data blocks sent by the output wire 6; the generator 3 of pseudo-random sequence (PRNG) is advanced by one position at the end of each data block emitted by the generator 1 and the output 5 of this generator 3 selects, by the switch 4 (S=switch), the DD0 word at the output 7 if the bit at output from the generator 3 is equal to 0, or the output 8 if the bit at output from the generator 3 is equal to 1. The source 1 through a control signal emitted on the connection 9, advances both generator 3 and a generator 2 (WG) that outputs the words DD0 and DD1 respectively at the outputs 7 and 8. The DDi word selected by the switch 4 (S) is sent into the inserter 10 (I) that inserts the word DDi at the end of the data block to which this word is pertinent. The data blocks with the inserted DDi words are emitted on wire 11.

Figure 2:
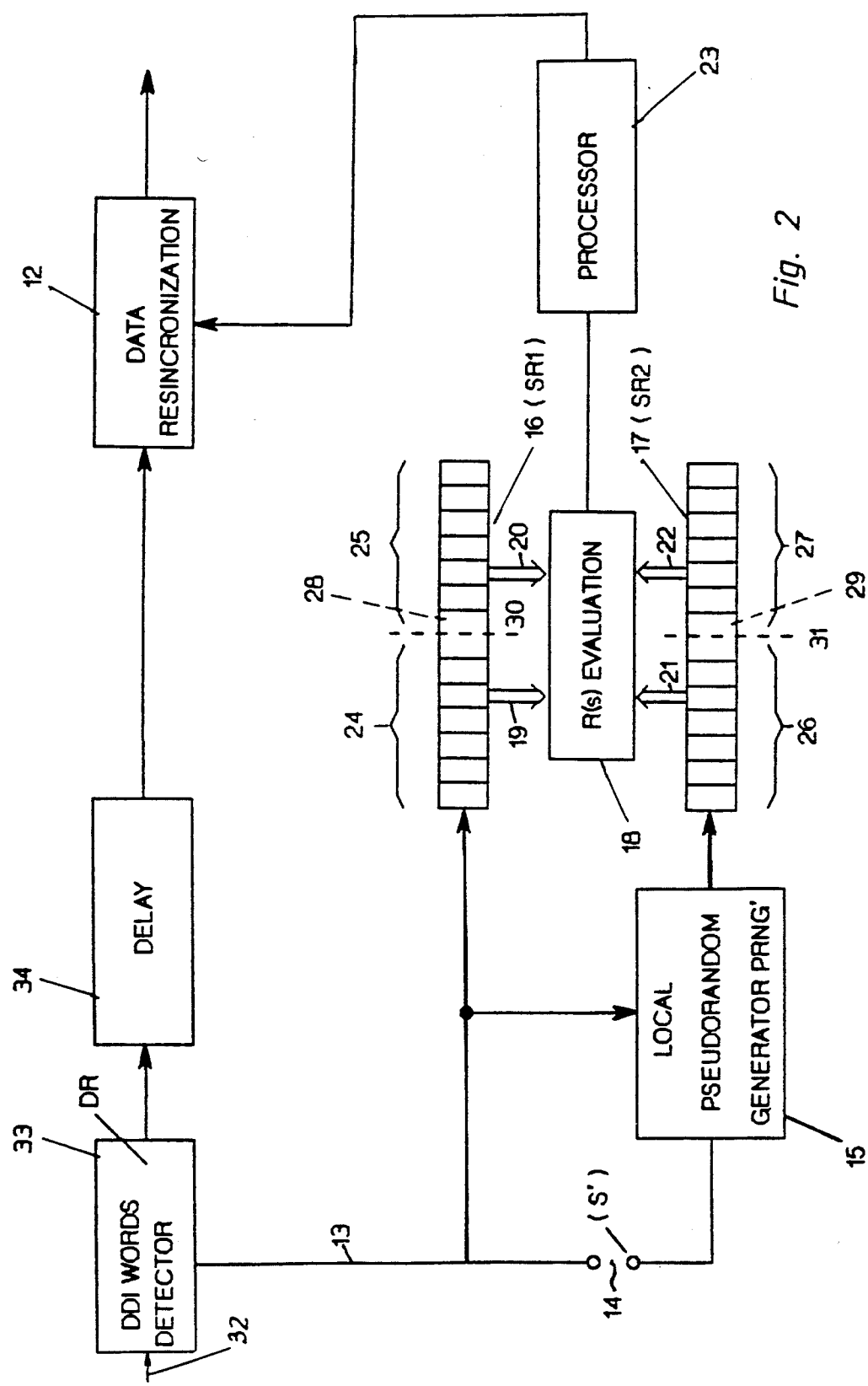
FIG. 2 shows the structure on the reception side suitable for recognizing the errors in the data block delimiting words.

In FIG. 2, showing the reception device, the data emitted at the output 11 of FIG. 1 arrive at the input 32 of a data detector 33 (DR) that recognizes the DDi words, and if they are correctly received, transforms them in bits 0 or 1 according to the same convention used on the transmission side, these binary values being emitted on the wire 13. The local source 15 (PRNG') emits the same pseudo-random sequence emitted by the generator 3 (PRNG) in transmission (FIG. 1); the source 15 is synchronized, in an initial phase, by sending to it an adequate number of bits emitted by the detector 33 on wire 13; this is done by closing the switch 14 (S'). For example, for the pseudo-random binary sequence having a length $2^n-1$, n bits that enter into the source 15 are sufficient for its synchronization. The local source 15 is then advanced by one bit for each DD1 signal recognized by the block 33; this is schematically indicated in FIG. 2 by the coupling of wire 13 into the generator 15. The binary data coming out of the detector 33 and source 15 are sent respectively into the storing means e.g. shift registers 16 (SR1) and 17 (SR2), where the data advance one position, for each bit emitted by the wire 13. In a preferred embodiment of the invention, the shift registers 16 and 17 are each divided in two parts and each part includes a number of bits slightly higher than n for the sequence of length $2^n-1$. The two parts 24 and 25 of the register 16 are divided by the line 30 and the two parts 26 and 2 the register 17 are divided by the line 31.

The error detecting actions and the following correction actions are carried out when a data error is revealed by the position 28 and 29 of the parts of registers 16 and 17, indicated respectively by 25 and 27. This requires that, before making any corrective actions, it is necessary to accumulate a suitable number of binary data in the two registers. As these corrective actions involve the rejection of some data blocks or the introduction of dummy data blocks, the data blocks divided in this manner by the DD1 words revealed in block 33 are delayed by a delay element 34.

By means of the connections 19, 20, 21, 22 the binary data of the registers 16 and 17 are transmitted into the block 18 where the correlation values R(s) are calculated for same values of "s" starting from 0. These values are processed in the processor 23 that establishes the corrective actions. The corrective actions are made by the re-synchronization of data blocks 12.

The use of correlations among the binary sequences, with the aim of detecting errors on DDi words, is explained with reference to the FIG. 3, where, as an example, the binary sequence having a length 127 or $2^7-1$ is used and therefore the exponent n is equal to 7, and generated by the primitive polynomial: $X^7 + x + 1$. On the lines 37, 39, 41 it is indicated at a certain instant the contents of the register 17 related to the local source for three different error types, while on the lines 38, 40, 42 it is indicated the similar contents of the register 16 related to the revealed DDi words. In the three cases, the line 30 divides each one of the conditions of registers in an equal number of bits.

In absence of errors, the correlation R(O) calculated on the 8 bits on the right side of the line 30 assumes the value 8 because the contents of the registers 16 and 17 are equal in these positions (the correlations are calculated as usually as the additional of the products transforming the bit 1 into −1 and the bit 0 in 1). In the case where one error occurred in which the DDO word is transformed in DD1 word, this error, during the progress of the register 16 is transformed into the bit 1, as indicated by 29 in FIG. 3a, the bits being corrected at preceding times (on the right side of the bit 29) and the bits in the future times. Then, by computing with R(O) the correlation of zero order between the lines 37 and 38 and relative to the 8 bits on the right side of the separated 30, and with R'(O) the similar correlation on the 8 bits on the left side of the demarcation 30, the result is that R(O) = 6 and R'(O) = 8, which identifies the error type and the relevant position.

In FIG. 3b, it is assumed that an error has occurred which has transformed a word belonging to the data into the DDO word; this is indicated by the insertion of the zero 35 in the line 40. As this zero value has really inserted, owing to the error, the inside of a zero sequence, this error is detected by a value of R(O), as indicated previously, being lower than the value 8 only when, during the advance of the shift registers, the value 1 appear in position 28 on the line 39 of FIG. 3b. Owing to this error, R(O) < 8, but also R'(O) is lower than the value 8. Vice versa, R(O) = 8, the value of R'(+1) or the correlation of order 1 R(O) = 8, the value of R'(+1) or the correlation of order 1 among the eight bits on the left side of the division line 30, with the 8 bits of the line being considered dephased on the right side of line 30. This is sufficient to establish that a DDO value was introduced, even if its position is unknown in the succession of seven values 0 on the right side of line 30. In any case, it is possible to re-synchronize the system and take measures for eliminating the data blocks whose values are to be considered to be affected by possible error. In FIG. 3c, a condition is shown in which a DDO value was lost in the position 36. In this case, when the first value 1 of the line sequence 42 enters into the position 29, it results in R(O) < 8; in this case, R'(−1) = 8. Therefore, we are in a condition similar to the one occurred in the case of FIG. 3b.

Until now, the cases examined involved a sole error in the bits contained at a certain instant in the register 16 of the reception side. This represents the most frequent type of errors; but, in the case where 2 or 3 errors occur in the whole range of bits contained in the register 16, at the moment in which it occurs that R(O) < 8, R(±1), R"(±2) R"(±3) involve all bits of the register 16 and 17. By letting the two registers 16 and 17 progress by a suitable number of steps (with the data of the example it can be, e.g., 20 bits), one of the two above-mentioned correction values may become correct (or with the value 16); from this, it occurs that the sequences of the registers 16 and 17 are correct but dephased by a certain number of bits (e.g., by 3 bits in advance or in delay, if one of the two values R(±3) is equal to 16). In this case, it is generally possible to resynchronize the received data blocks If the resynchronization does not occur within a prefixed number of binary elements entered the shift registers, the system can be re-synchronized by closing the switch 14 in FIG. 2.

The above example is presented to explain the main concepts of the invention; obviously, the skilled technician of this field can apply some variants to the main concepts of the present invention.

A possible variant can be introduced to avoid losing a large number of data blocks when the pseudo-random sequence outputs long sequences of values equal to one or zero ciphers. This is illustrated in FIG. 3. When a DDO (represented by the value 0) is inserted or destroyed in a zero sequence and a similar thing is made for DD1, all blocks delimited by the values DDO=0 contained in this sequence are lost if it is considered the right reconstruction of the received data. With this aim, it is possible to use, for example, the pseudo-random sequences generated by two shift registers, the first of which generates a relatively short sequence (and then where the configurations with many zero or one ciphers in sequence are short) and the second generates a very long sequence. The short pseudo-random sequence, having a period f (or that it repeated cyclically with frequency f) is used with correct and negated bits and this is made according to the bits coming out from the second pseudo-random sequence, these bits being emitted now at the rate f. For example, if it is desired to generate a sequence having a length about 16,000, this can be achieved by the shift register of 14 bits generating a sequence of length $2^{14}-1 = 16,383$, where sequences of following zeros of any length until the length 13 are present. Vice versa, using two shift register, one of 4 bits (in which, if desired, the configuration of 4 following zero ciphers) and the second register of 10 bits, a sequence of length $16 \times 1023 = 16,368$ can be obtained in which the sequences of one or zero ciphers are represented with a maximum length of 4 ciphers. In this way, the initial synchronization phase of the receiver is lengthed, but is generally of little importance.

Obviously the invention has been described or clarity's sake with reference to the drawings and examples, but it is not limited to these embodiments as it is susceptible of changes and modifications which, being within the reach of the person ordinarily skilled in the art, fall naturally within the spirit and scope of the following claims.

What is claimed is:

1. A method for transmitting digital signals including data blocks, each of said data blocks being delimited by a DDi word, where i is an integer, that is introduced in a system transmission side and is recognized in a system reception side, said data blocks being located in transmission according to an order that must be constructed in reception from the digital signals received even when transmission line errors result from a destruction of at least one of said data blocks delimiting word and even when transmission line errors introduce untransmitted delimiting words, comprising the steps of:

at the transmission side:

a) producing a sequence of pseudo-random signals using a generator, said sequence comprising symbols having a periodicity equal to an enumeration period of the delimited data blocks, each symbol of the sequence being selected from "q" possible symbols;

b) correlating q words delimiting the data blocks with said q symbols that are emitted in the pseudo-random sequence;

c) advancing by one step the sequence of pseudo-random signals each time a new data block is transmitted.

d) for each advance, supplying a symbol from said generator that indicates the words delimiting the data blocks;

and at the reception side;

e) generating the same pseudo-random sequence of symbols used at the transmission side using a local generator on the reception side;

f) advancing by one step the sequence of symbols each time a word delimiting a block is detected in the signal received;

g) recognizing and transforming the data block delimiting words into the corresponding symbols of the pseudo-random sequence, forming a sequence of symbols that, in absence of errors, is equal to the pseudo-random sequence generated by said local generator on the reception side;

h) locally generating a first series of symbols comprising an adequate number of symbols of the said pseudo-random sequence as in step e):

i) storing a second series of symbols comprising an adequate number of symbols associated with the words delimiting the data blocks as in step g);

j) comparing the symbols of steps h) and i);

k) detecting possible lack of coincidences between said first and second series of symbols;

l) calculating correlations of said first and second series of symbols to determine an error type; and m) recovering the ordering of data blocks emitted in transmission in accordance with the error type determined in step l).

* * * * *